C. E. Goodhue,
Urn Stand.
No. 95,104.
Patented Sep. 21. 1869.
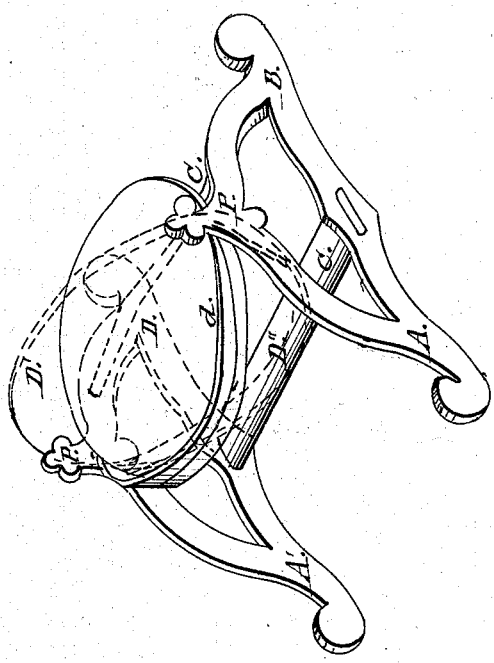
Witnesses:
William Edson
Seth B. Edson
Inventor:
Chas. E. Goodhue.

United States Patent Office.

CHARLES E. GOODHUE, OF MALDEN, MASSACHUSETTS.

Letters Patent No. 95,104, dated September 21, 1869.

IMPROVED URN-STAND.

The Schedule referred to in these Letters Patent and making part of the same.

*To all whom it may concern:*

Be it known that I, CHARLES E. GOODHUE, of Malden, in the county of Suffolk, and State of Massachusetts, have invented certain new and useful Improvements in Urn-Stands; and I do hereby declare that the following is a full and exact description thereof, reference being had to the accompanying drawings, and to the letters of reference marked thereon.

The nature of my invention consists in making a portable urn-stand, the shelf of which is so hung upon pivots that the urn standing upon it may be easily tipped when desired, and yet finds firm support while resting upon the stand.

To enable others skilled in the art to make and use my invention, I will proceed to set forth its construction and use.

The drawings represent, in perspective, one form of my invention.

A B A' represent the frame of the stand.

C C' are cross-bars to give additional strength and support to the frame.

D is a disk, hung upon two pivots.

*d d* is a guard upon the front edge of the disk, which serves to prevent the urn, tea, or coffee-pot, which is placed upon it, from being set so far over that the greater part of the weight should be in front of a line connecting the pivots P P', in which case the urn, tea, or coffee-pot would tip over, from its own weight.

The pivots P P' are set a little in front of a line drawn through the centre. The urn will rest on the pivots and upon the back bar C of the frame of the stand.

I am aware that coffee and tea-urns have been made with journals attached, and hung in frames so that they could be tilted, and also that a stand has been made having its bottom hinged at one edge; but these are objectionable, the first, because the urn and stand are united, and a lamp has to be used for heating the contents; the latter, because the hinge, being at one edge, requires the vessel to be secured to it in some way, in order to raise the bottom with the urn, in tipping the latter, and requires nearly as much power to tip it as it would to lift it bodily. By my method of pivoting the bottom, the weight is very nearly balanced thereon, and can therefore be tipped or tilted with very little effort, and at the same time is prevented from upsetting by having the weight preponderate slightly on one side, as described, and thus I produce an implement that is admirably adapted to the purpose intended.

Having thus described my invention,

What I claim, is—

A stand for coffee-pots and similar vessels, consisting of the frame A and the tilting bottom D, provided with the ledge *d*, pivoted eccentrically, and arranged to rest on the bar or stop C, substantially as shown and described.

CHAS. E. GOODHUE.

Witnesses:
SETH B. EDSON,
A. HUN BERRY.